L. J. Cumier,
BEST AVAILABLE COPY
Cook Stove.
No. 17. (.41) Patented Nov. 8. 1838.
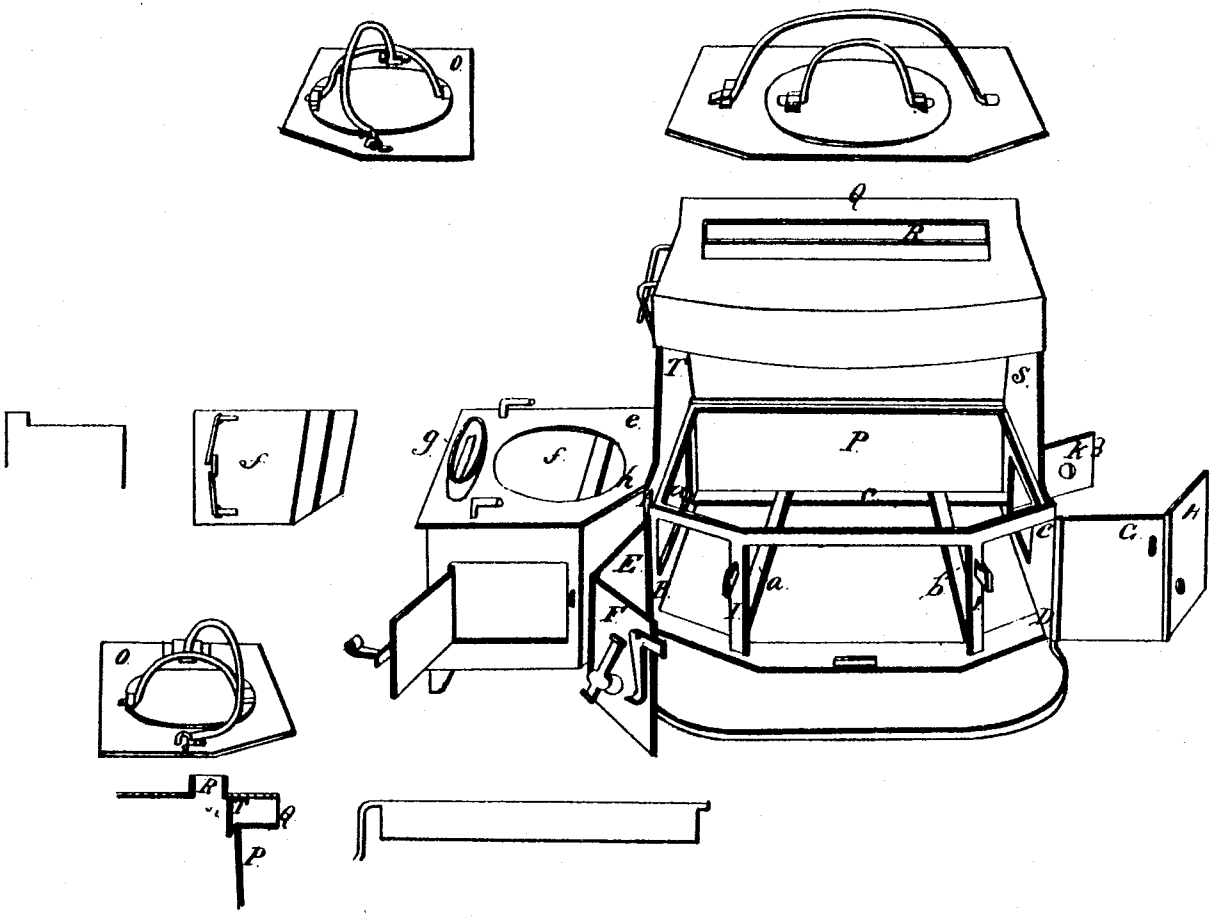
A. PETTEL PHOTO-LITHOGRAPHER, WASHINGTON, D. C.